United States Patent [19]

Morgan, Jr.

[11] Patent Number: 4,983,292
[45] Date of Patent: Jan. 8, 1991

[54] SEAMLESS FILTER BAG AND METHOD OF ITS MANUFACTURE

[76] Inventor: H. William Morgan, Jr., Filter Specialists, P.O. Box 735, Michigan City, Ind. 46360

[21] Appl. No.: 282,870

[22] Filed: Dec. 9, 1988

Related U.S. Application Data

[63] Continuation of Ser. No. 212,140, Jun. 27, 1988, abandoned, which is a continuation of Ser. No. 139,063, Dec. 21, 1987, abandoned, which is a continuation of Ser. No. 75,207, Jul. 17, 1987, abandoned, which is a continuation of Ser. No. 881,800, Jul. 3, 1986, abandoned.

[51] Int. Cl.$^5$ ............................................. B01D 39/16
[52] U.S. Cl. ................................. 210/491; 264/248; 383/102
[58] Field of Search .............. 210/448, 452, 484, 491; 264/248; 156/167; 383/102, 117

[56] References Cited

U.S. PATENT DOCUMENTS

| | | | |
|---|---|---|---|
| 3,331,221 | 7/1967 | Lawson, Jr. | 383/102 |
| 3,415,012 | 12/1968 | Stubbmann | 383/117 |
| 3,755,527 | 8/1973 | Keller et al. | 156/167 |
| 3,870,567 | 3/1975 | Palmer et al. | 156/167 |
| 4,115,502 | 9/1978 | Rasmussen | 156/167 |
| 4,116,738 | 9/1978 | Pall | 264/248 X |
| 4,240,864 | 12/1980 | Lin | 156/167 |
| 4,241,123 | 12/1980 | Shih | 156/167 |
| 4,285,814 | 8/1980 | Morgan, Jr. | 210/452 X |

Primary Examiner—Frank Spear
Attorney, Agent, or Firm—James D. Hall

[57] ABSTRACT

A method of producing a closed end seamless liquid pervious article, such as filter bags, by rotating a mandrel in the flow path of a quanity of melted microwoven filaments to collect the filaments upon the mandrel in multiple layers.

7 Claims, 2 Drawing Sheets

4,983,292

SEAMLESS FILTER BAG AND METHOD OF ITS MANUFACTURE

This is a continuation of Ser. No. 212,140, filed June 27, 1988; which is a continuation of Ser. No. 139,063, filed Dec. 21, 1987; which is a continuation of Ser. No. 075,207, filed Sept. 17, 1987, which is a continuation of Ser. No. 681,800, filed July 3, 1986, all now abandoned.

FIELD OF THE INVENTION

This invention relates to liquid pervious filtration articles and will have special application to a seamless filter bag and a method by which the bag may be formed.

BACKGROUND OF THE INVENTION

A large number of porous filament filter bags are produced by a process commonly known as "melt-blowing." In this process, micro-woven filaments are melted and propelled toward a target surface, usually a rotating drum where the material is formed into a laminated layer. This process is described in U.S. Pat. Nos. 3,972,759 and 3,978,185. After the layer is collected from about the rotating drum, it is cut into pieces which are approximately the size of a filter bag and each piece when is stitched together to form a continuous wall for the bag. Such stitching lowers the efficiency of the filter bag around the needle holes and increases the possibilities of bag separation under high operating pressures.

SUMMARY OF THE INVENTION

The method of this invention allows seamless filter bags and similar articles to be formed. A mandrel which approximates the shape of the article is placed in the flow path of molten filaments and rotated. In the below described embodiment, the mandrel is cylindrical and includes a hemispherical end cap which produces bags of uniform, continuous wall thickness.

Accordingly, it is an object of this invention to provide seamless filter bags and the novel method of their manufacture.

Another object of this invention is to provide for a filter bag which is both more durable and more efficient than previous filtration bags.

Another object of this invention provides for a method of producing seamless filter bags which is efficient and economical.

Still another object of this invention is to provide for a novel method of producing seamless, laminated filter bags.

Still another object of this invention is to provide for a method of producing seamless, closed-end articles from molten micro-woven filaments.

Other objects of this invention will become apparent upon a reading of the following description.

BRIEF DESCRIPTION OF THE DRAWINGS

A preferred embodiment of this invention has been depicted for purposes of illustration wherein.

DESCRIPTION OF THE PREFERRED EMBODIMENT

Figure 1:
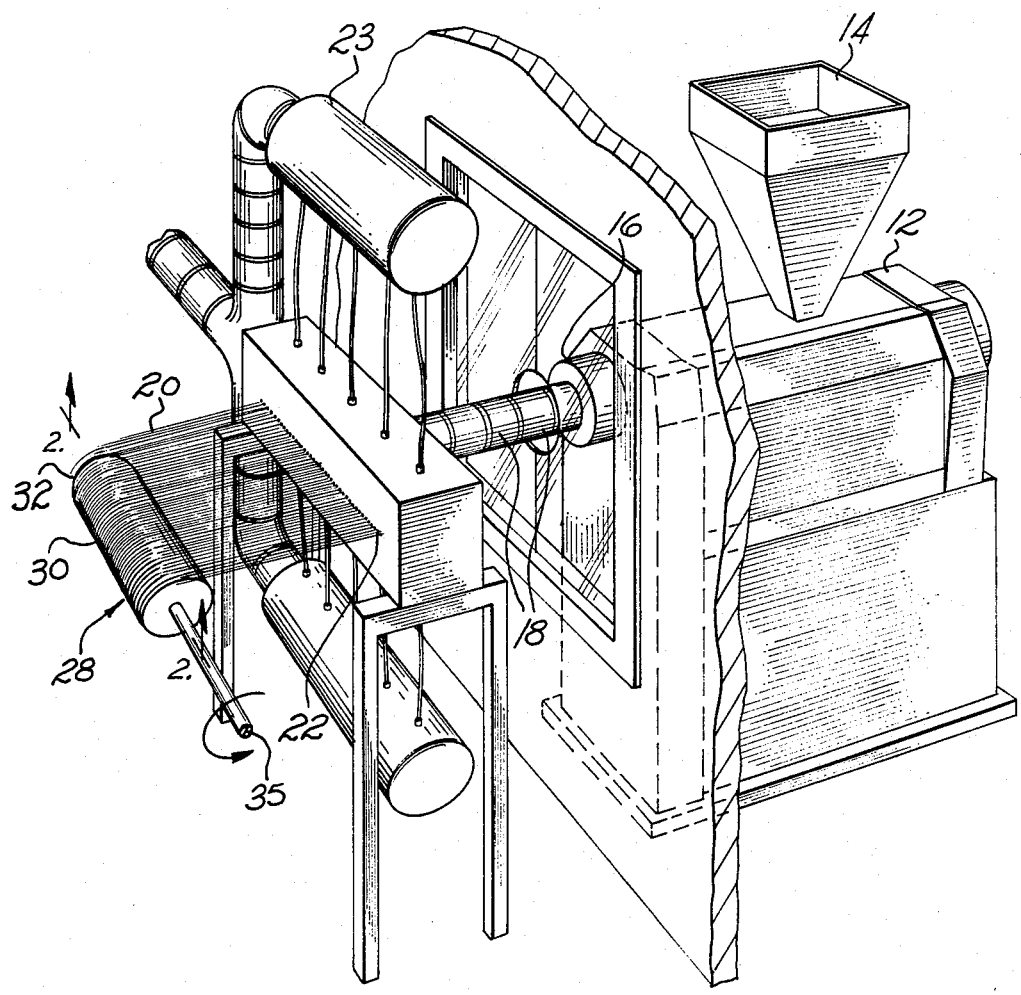
FIG. 1 is a perspective view of the equipment used in forming the filter bags of this invention.

The preferred embodiment herein described is not intended to be exhaustive or to limit the invention to the precise form disclosed. It is chosen and described to explain the principles of the invention and its application and practical use to enable others skilled in the art to utilize the invention.

The method of this invention may be best understood by the following description and workings of the equipment which is used to produce the seamless filter bag 10. A main piece of equipment is a conventional extruder 12 shown in FIG. 1. The quantity of material 20, preferably polypropylene or other materials capable of producing filaments when molten and air dried, is introduced into extruder 12 at hopper 14 and is fed to a nozzle 16. A plurality of ring heaters 18 circumscribe nozzle 16 and serve to produce heat sufficient to liquify material 20 as it flows into the nozzle. Nozzle 16 terminates in a plurality of laterally spaced discharged outlets 22 through which material 20 in its molten state is propelled in melted and fibrous form by heated air from manifolds 23 towards a target. The method thus far described is disclosed in U.S. Pat. Nos. 3,972,759 and 3,978,185 which are incorporated herein by reference.

Figure 2:
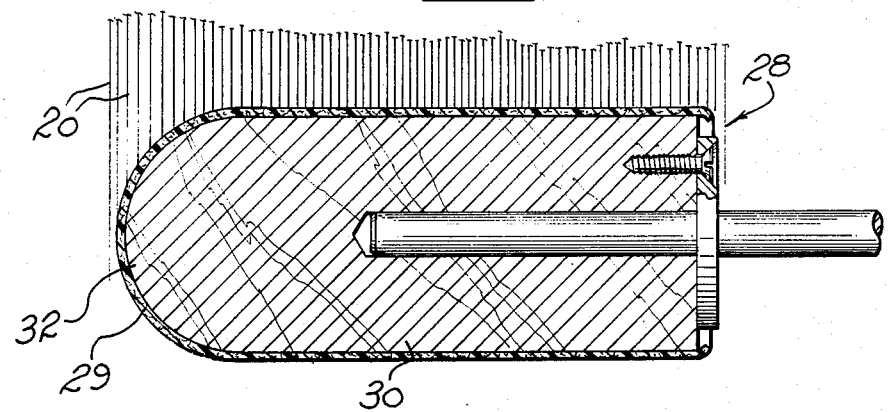
FIG. 2 is a longitudinal sectional view of the mandrel and filter bag taken along line 2—2 of FIG. 1.
Figure 3:
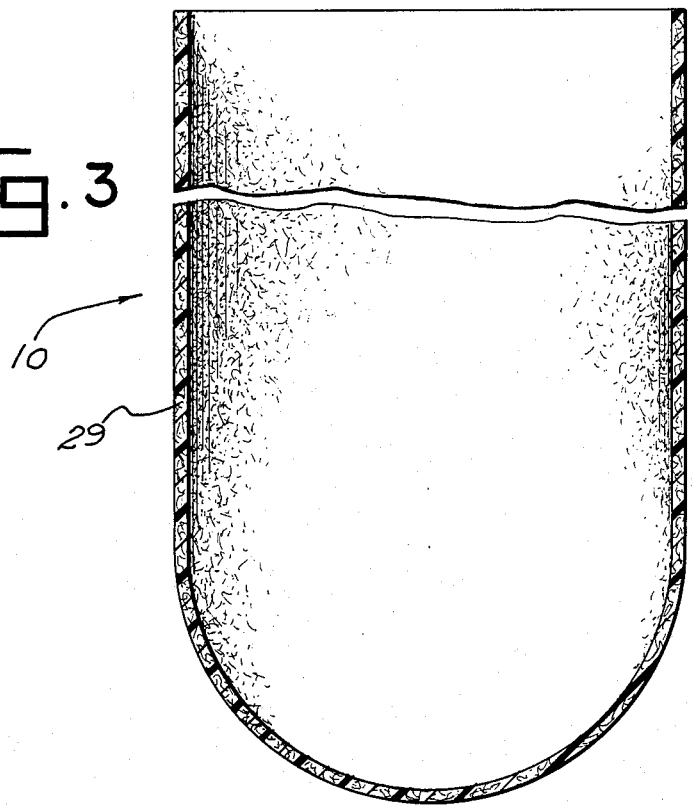
FIG. 3 is a longitudinal sectional view of the filter bag produced according to the method of this invention.

FIG. 1 depicts the method of this invention and the equipment used. A mold is provided, which in the described embodiment is a mandrel 28. Mandrel 28 may be formed from wood or like material and resembles in its outer configuration the intended shape of the filter bag to be produced. Mandrel 28 is shown having a cylindrical body 30 and a substantially hemispherical end cap 32. As seen in FIG. 2, mandrel 28 is connected to a rod and rotated about an axis 35 by any conventinal means within the flow path of the fibrous material from nozzle discharge outlets 22. Mandrel 28 is placed sufficiently close, preferably between 1-3 feet, to outlets 22 and rotated at a constant speed of between 30-80 rpm. At this distance, the fibrous material is sufficiently cooled as it reaches the area of mandrel 28 so as to be formed about the mandrel in layers. After a selected period of time predetermined to allow a sufficient thickness of the layered material 29 about the mandrel to be formed, the mandrel is withdrawn from the material flow path. During rotation of the mandrel in front of nozzle discharge outlets 22, the hemispherical end cap 32 of the mandrel allows the layered material 29 to be formed about the cap with the same thickness as that of the thickness of the material which is formed about the cylindrical body 30 of the mandrel, as seen in FIG. 2. Once the mandrel is withdrawn from the material flow path in front of discharge outlets 22, the layered material 29 about the mandrel can be pulled from the mandrel to form the filter bag 10 shown in sectionalized form in FIG. 3. Alternatively, mandrel 28 can be moved transversely along axis 35 until end cap 32 faces outlets 22. To bag 10 can be connected, such as by thermal welding, a suitable rim which allows the bag to be utilized in an appropriate filter housing.

Although the above description teaches the formulation of seamless filter bags of uniform thickness, it is understood that by providing a mandrel of varying cross-sectional shape, a seamless bag may be formed of various wall thicknesses without deviating from the spirit of this invention.

It is to be understood that the above-described invention is not to be limited to the details above given but may be modified in accordance with the following claims.

What I claim is:

1. A method of producing a seamless closed-end bag from microwoven filaments comprising the steps of:
    (a) melting and propelling said filaments in a flow path;
    (b) providing a mandrel having a terminal end portion, said mandrel of the general shape which closely resembles the desired shape of said closed-end bag;
    (c) positioning said mandrel in said flow path wherein said mandrel is contacted by said propelled filaments; and
    (d) moving said mandrel within said flow path wherein the mandrel including said end portion is coated with said filaments to form said bag.

2. The method of claim 1, wherein said mandrel includes a cylindrical body portion, said end portion integral with said mandrel body, said cap end portion having a major diameter equal to the diameter of said body.

3. The method of claim 2, wherein said end portion is substantially hemispherical and is rotated at a constant speed whereby said bag is of a uniform thickness.

4. The method of claim 2, wherein said mandrel is rotated at a velocity slow enough to allow laminations of said filaments to form said bag.

5. The method of claim 1, wherein said bag is liquid pervious.

6. A liquid filter bag comprising a continuous seamless wall formed of overlapping liquid filtering layers of fibrous material, said wall including an integral cup-shaped, closed end; said filter layers being formed of liquid pervious micro-woven filaments.

7. A method of producing a seamless closed-end bag from mircro-woven filaments comprising the steps of:
    (a) Melting and propelling said filaments in a flow path;
    (b) Providing a mandrel having a substantially cylindrical body portion and an end cap portion integral with said mandrel body, with the mandrel end cap portion being substantially hemispherical;
    (c) Positioning said mandrel in said flow path; and
    (d) Rotating said mandrel at a constant speed within said flow path wherein the mandrel including said cap portion is coated with said filaments to form said bag.

* * * * *